United States Patent
Kawano et al.

(10) Patent No.: US 7,141,229 B2
(45) Date of Patent: Nov. 28, 2006

(54) GRAPHITE MATERIAL FOR NEGATIVE POLE OF LITHIUM SECONDARY BATTERY, METHOD OF MANUFACTURING THE GRAPHITE MATERIAL, AND LITHIUM SECONDARY BATTERY

(75) Inventors: Yoichi Kawano, Fukuoka (JP); Tetsusei Fukuda, Fukuoka (JP); Tsutomu Sugiura, Fukuoka (JP); Takeshi Hamada, Chiba (JP); Hiromasa Shoji, Chiba (JP); Taro Kohno, Tokyo (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 339 days.

(21) Appl. No.: 10/469,854

(22) PCT Filed: Feb. 28, 2002

(86) PCT No.: PCT/JP02/01861

§ 371 (c)(1),
(2), (4) Date: Sep. 5, 2003

(87) PCT Pub. No.: WO02/071515

PCT Pub. Date: Sep. 12, 2002

(65) Prior Publication Data

US 2004/0091782 A1    May 13, 2004

(30) Foreign Application Priority Data

Mar. 6, 2001 (JP) .............................. 2001-62351

(51) Int. Cl.
  C01B 31/04 (2006.01)
  C01B 31/00 (2006.01)
  H01M 4/58 (2006.01)
  H01M 4/02 (2006.01)

(52) U.S. Cl. .............. 423/448; 429/231.8; 429/231.95; 429/231.4

(58) Field of Classification Search ................. 423/448; 429/231.8, 231.95, 231.4
See application file for complete search history.

(56) References Cited

U.S. PATENT DOCUMENTS

| 4,670,201 A | * | 6/1987 | Montgomery et al. ...... 264/486 |
| 4,873,071 A | * | 10/1989 | Yamada et al. ............. 423/448 |
| 5,900,189 A | * | 5/1999 | Kawano et al. ............. 252/502 |

FOREIGN PATENT DOCUMENTS

| JP | 05-266880 A1 | 10/1993 |
| JP | 09-251855 A1 | 9/1997 |
| JP | 10-312809 A1 | 11/1998 |
| JP | 10-326611 A1 | 12/1998 |
| JP | 2001-357849 A1 | 12/2001 |
| WO | WO-98/29335 A1 | 7/1998 |
| WO | WO-00/22687 A1 | 4/2000 |

OTHER PUBLICATIONS

International Search Report for PCT/JP02/01861 mailed on Jun. 11, 2002.
English Translation of International Preliminary Examination Report for PCT/JP02/01861 mailed on Oct. 10, 2003.

* cited by examiner

*Primary Examiner*—Stuart L. Hendrickson
*Assistant Examiner*—Alvin T Raetzsch
(74) *Attorney, Agent, or Firm*—Rader, Fishman & Grauer PLLC

(57) ABSTRACT

This invention relates to a graphite material for negative electrode of lithium secondary battery. This graphite material is obtained by carbonizing the pulverized green coke to yield coke, adding one kind or more of boron or a compound thereof to the coke, graphitizing the resulting mixture and controlling the particle size of the product graphite. This graphite material for negative electrode is characterized by showing a tap density of 0.95 g/cm³ or more after tapping 20 times or 1.15 g/cm³ or more after tapping 300 times and a BET specific surface area of 1.5 m²/g or less. A lithium secondary battery made by the use of this graphite material for negative electrode has a large discharge capacity and suffers little loss during charging and discharging.

4 Claims, No Drawings

GRAPHITE MATERIAL FOR NEGATIVE POLE OF LITHIUM SECONDARY BATTERY, METHOD OF MANUFACTURING THE GRAPHITE MATERIAL, AND LITHIUM SECONDARY BATTERY

FIELD OF TECHNOLOGY

This invention relates to a lithium secondary battery utilizing intercalation and deintercalation of lithium, a graphite material used for the negative electrode of said secondary battery and a process for manufacturing said graphite material.

BACKGROUND TECHNOLOGY

A lithium secondary battery using graphite as a negative electrode has been studied extensively because it is free from the old problem accompanying the use of metallic lithium or the problem of dendrite growth at the time of charging, it generates high electromotive force and it gives a highly reliable performance.

Carbonaceous materials classified as graphite are diversified in shape, structure and texture and the differences in these factors are reflected in the performance of electrodes. A secondary battery in which flake graphite such as natural graphite is used as a graphite material is known to have a higher discharge capacity than the one in which synthetic graphite obtained by graphitizing mesophase microbeads, pitch-derived carbon fibers, pitch coke and the like is used because of a highly developed crystal structure of flake graphite. However, one problem with flake graphite is a high initial irreversible capacity of a battery made therefrom. In addition, it appears difficult to obtain a high discharge capacity when flake graphite is used under the conditions of large charge and discharge current. Further problems associated with flake graphite are high bulk density of particles and difficulty in preparing a slurry for coating use. For the purpose of improving the maneuverability and particle characteristics of flake graphite, processes consisting of blending flake graphite with an organic binder or coating the surface of flake graphite with an organic binder followed by granulation and heat treatment are proposed in JP10-36108 A and elsewhere. According to these processes, however, a part of the binder component remains behind thereby reducing the discharge capacity.

When mesophase microbeads collected at the stage in which an optically anisotropic phase forms spherically in mesophase pitch are used as a raw material for graphite, the growth of carbon layer after graphitization is inferior to that in natural graphite and the discharge capacity thereby obtained amounts to merely 80–85% of the theoretical discharge capacity.

It is reported in J. Electrochem. Soc., Vol. 142, No. 8, 2564 (1995) that pitch-based carbon fibers possess a variety of properties as synthetic graphite and yield electrodes of excellent heavy load characteristics. Being a fiber, however, raises problems such as the following; the growth of crystal structure is retarded to keep the discharge capacity from increasing beyond a moderate level and the necessity of installing a fiber-making step and the like incurs an extra manufacturing cost.

Pitch coke belongs to a class of readily graphitizable materials and, upon graphitization in an ultra-high temperature range, may form carbon network layers whose interlayer distance is close to that of natural graphite; however, in the case where pitch coke has not much of optically anisotropic textures, graphitization does not progress to a degree comparable to natural graphite and the carbon network layers are not preferentially oriented in the specified direction in the crystal structure. In consequence, graphite of this kind is free of the restriction on the current density such as seen in the case of natural graphite like flake graphite and is an extremely promising material for negative electrode of lithium secondary battery as evidenced by a large number of researches made on it up to the present (for example, JP63-121257A, JP1-204361A and JP4-206276A). However, a material obtained by calcining ordinary pitch coke at an ultra-high temperature (2000–3000° C.) shows a lower discharge capacity (<300 mAh/g) than the theoretical discharge capacity (372 mAh/g).

An attempt has been made to provide graphite with a high discharge capacity by adding boron to carbon particles derived from pitch coke or pitch, for example, in JP10-223223A This method is effective for raising the discharge capacity and reducing the irreversible capacity and provides a technique effective for improving the performance of graphite materials for negative electrodes. On the other hand, this method requires a pulverizing operation in the step for particle size control and may develop the possibility of deteriorating the particle characteristics such as reducing the bulk density and tap density and increasing the specific surface area. In addition, there remain practical problems in need of solution such as lack of stability in manufacture of electrode foils and insufficient particle characteristics relating to cycle performance of materials for negative electrodes.

DISCLOSURE OF THE INVENTION

An object of this invention is to provide commercially a lithium secondary battery which has a large discharge capacity, suffers little loss in capacity during charging and discharging and possesses good particle characteristics and also a material for the negative electrode of said battery.

The graphite material for negative electrode of lithium secondary battery of this invention is obtained by pulverizing green coke, carbonizing the pulverized green coke to a carbonaceous material (coke), adding one kind or more of boron or a compound thereof to the coke, graphitizing the mixture and controlling the particle size and the graphite material thus obtained shows a tap density of 0.95 g/cm$^3$ or more after tapping 20 times or 1.15 g/cm$^3$ or more after tapping 300 times and a BET specific surface area of 1.5 m$^2$/g or less.

This graphite material for negative electrode of lithium secondary battery can be obtained by preparing green coke from heavy oil derived from coal and/or petroleum as a raw material, pulverizing the green coke to an average particle diameter of 50 μm or less, carbonizing the pulverized green coke at 700–1500° C. to coke, adding one kind or more of boron or a compound thereof to the coke, graphitizing the mixture and controlling the particle size of the resulting graphite.

The lithium secondary battery of this invention containing a positive electrode active material, a negative electrode active material and a nonaqueous electrolyte comprises the aforementioned graphite material for negative electrode as a negative electrode active material.

This invention will be described concretely below.

The graphite material to be used for negative electrode of lithium secondary battery of this invention (hereinafter referred to as graphite material or graphite material for negative electrode) is manufactured by a process comprising the steps for pulverizing green coke, carbonizing the pulverized green coke to coke and graphitizing the coke at high temperature.

Green coke is obtained by coking coal-derived heavy oil or petroleum-derived heavy oil or a mixture of the two at 400–550° C., preferably at 450–500° C., for 20–50 hours.

Coal-derived heavy oil includes coal tar, coal tar-derived heavy oil and coal tar pitch and petroleum-derived heavy oil includes petroleum pitch, asphalt, fuel oil and heavy crude oil. As occasion demands, these raw material heavy oils are mixed with a variety of additives or stripped of specified components to control the properties of green coke resulting from coking. For example, coal-derived heavy oil contains quinoline-insolubles (QI). It is desirable to remove QI as they impede graphitization of coke. In order to obtain a high discharge capacity, it is preferable to control the raw materials in such a manner as to develop the texture and structure to a degree as practicable as possible.

Several processes are known for converting heavy oil to green coke by the coking reaction; for example, delayed coking, Fluid Coking, contact coking and Flexicoking. The delayed coking process which utilizes a delayed coker as a reactor can be used advantageously because of its excellent productivity and uniformity and stability of reaction products. This is a commercial process for manufacturing green coke and practiced by preliminarily heating heavy oil, allowing the oil to react in a coking drum for several tens of hours and taking out the product by a high-pressure water jet.

Green coke is normally obtained in lumps and contains 5–15 wt % of volatiles. Green coke is then subjected to carbonization (calcination) to yield coke. It is preferable for the coke obtained by carbonization to show anisotropy due to flow texture.

The texture of coke is observed under an optical microscope, a polarized light microscope and the like to tell the presence or absence of anisotropy and, further, its theoretical discussion is possible by evaluating the coefficient of thermal expansion after graphitization. This anisotropy can be controlled by the kind of raw material heavy oil and the manufacturing conditions, particularly by the QI content. The absence of anisotropy due to flow texture necessitates incorporation of a larger amount of boron, which may develop the possibility of deteriorating calcination and particle characteristics after graphitization. In the presence of anisotropy it is possible to obtain highly developed graphite crystals and a high discharge capacity.

Carbonization is carried out preferably in the temperature range of 700–1500° C. Ovens useful for this purpose include a rotary kiln calciner, Riedhammer oven, fluidized bed oven and tunnel kiln. In particular, a rotary kiln calciner is used advantageously because additives can be introduced to the oven relatively easily, the materials fed to the oven are uniformly mixed and the oven is operated with high productivity. In a small-scale operation, a heating apparatus such as an electric oven may be used.

According to the manufacturing process of this invention, green coke is pulverized to an average particle size of 50 µm or less, preferably 10–40 µm, before carbonization. Carbon in green coke before carbonization is in the stage of undeveloped texture and structure and pulverization of green coke at this stage greatly suppresses generation of flaky particles and at the same time sharply reduces the work load in the subsequent steps involving pulverization after carbonization and graphitization which are accompanied by deterioration of particle characteristics. Furthermore, the graphite material thus obtained occurs as particles possessing excellent characteristics such as high bulk density, high tap density and small specific surface area.

There is no restriction on the machinery to be used for grinding and examples include an impeller mill, jet mill, Raymond mill and ball mill. After grinding, coarse particles larger than 100 µm, preferably larger than 50 µm, are removed and the average particle diameter is preferably adjusted to a value within the aforementioned range.

When the heating temperature is low (for example, below 470° C.) during the manufacture of green coke, the content of volatiles becomes 10% or more (for example, 15% or so) and the phenomenon of fusion may occur during carbonization and the product cannot be taken out as free particles in some cases. In such a case, green coke is given a treatment for rendering it infusible by oxidizing its surface before carbonization and this treatment can suppress the phenomenon of fusion. The oxidation in this case is effected by the use of any oxidizing gas (or example, air, nitrogen oxide gas or ozone) or oxidizing liquid and preferred oxidizing agents are air in the case of gas or sulfuric acid in the case of liquid from the viewpoint of cost. This treatment keeps the particles from fusing together and allows carbonization to proceed surely to the core of particles. In consequence, the bulk density can be maintained at a high level and calcination formation of needle coke) can be suppressed. As a result, it is possible to raise the cell capacity as a negative electrode material. When the heating temperature in the manufacture of green coke exceeds, for example, 510° C., the content of volatiles drops below 5% and the phenomenon of fusion does not occur.

A boron material consisting of one kind or more of boron and compounds thereof is added to the coke obtained by carbonization and the mixture is graphitized at 2000–3000° C., preferably at 2300–2800° C. The term "boron material" in this specification means boron or a compound thereof or both and it is preferably boric acid, boron oxide, boron carbide, boron nitride or a borate. The amount of a boron material to be added is preferably 0.1–5.0 wt % as boron. Addition of a boron material accelerates graphitization to give a high-capacity negative electrode material and produces an effect of reducing the irreversible capacity at the initial charging and discharging. However, excessive addition may develop the possibility of the boron material separating out in the cooling period in graphitization or remaining as impurities in the negative electrode material.

According to the manufacturing process of this invention, graphitization is preferably carried out in an argon gas atmosphere above 2600° C. Ovens such as Achison oven and LWG oven are known for graphitization. Graphite crystals do not grow sufficiently if the temperature for graphitization is low while the volatilization of carbon increases when the temperature becomes too high. The use of an argon atmosphere in graphitization of a mixture of coke and a boron material suppresses formation of boron nitride and prevents the surface of particles from getting coated with an insulating film.

According to the manufacturing process of this invention, it is preferable to control the average particle diameter in the range of 3–50 µm by performing deagglomeration and/or classification after pulverization and/or carbonization of green coke. This procedure can reduce the proportion of fine and coarse particles that are not suited for a negative electrode material thereby preventing the negative electrode material from deteriorating in performance and improving the yield in the manufacturing step. Deagglomeration here means an operation involving a light degree of pulverization by a pulverizing machine and, in contrast to ordinary pulverization, the operation breaks up particles that are sticked together or particles that are bonded together weakly as a result of calcination after heat treatment and returns them to the original state with practically no destruction of the particles. A pulverizing machine to be used for this purpose is preferably the one that works with a minimal decrease in tap density and a minimal increase in specific surface area and its examples include an impeller mill, jet mill, Raymond mill and ball mill.

It is advantageous to perform both deagglomeration and classification. When the average particle diameter after deagglomeration and classification becomes short of 3 μm, a graphite material to be obtained after graphitization occurs as particles mainly containing of fine particles and such fine particles come off the layer of an electrode active material after coating. On the other hand, when the average particle diameter exceeds 50 μm, the surface of an active material applied to the electrode foil loses smoothness and the yield drops in the manufacturing step.

According to the manufacturing process of this invention, it is also allowable to control the particle size after graphitization. This operation is preferably performed by passing the particles through a sieve with an opening of 10–120 μm, preferably 50–100 μm. Classification by air which is capable of producing the same effect as the aforementioned sifting may also be used. By means of this control of the particle size, it is possible to prevent generation of flaws and unevenness during the coating of a metal foil with a graphite material for negative electrode or coming-off of fine particles from the electrode active material after coating.

The graphite material for negative electrode of lithium secondary battery of this invention must have a tap density of 0.95 $g/cm^3$ or more after tapping 20 times or 1.15 $g/cm^3$ or more after tapping 300 times and a BET specific surface area of 1.5 $m^2/g$ or less. The negative electrode material is used by suspending the particles thereof and a binder in an aqueous or nonaqueous solvent, coating a metal foil with the suspension and pressing to the specified active material density. The particle characteristics of a graphite material are of particular importance from the viewpoint of ease of preparation and stability of the suspension and also from the viewpoint of resistance of the charge and discharge cycle to the effect of orientation of particles accompanying a large change in density during the pressing step. That is, when the particles show a low bulk density and a large specific surface area, the characteristics change markedly and unevenness becomes pronounced during storage of the coating solution. Furthermore, when the bulk density is low, the active material density also decreases after coating and undergoes a large change during pressing to induce orientation of particles. This orientation of particles is linked to cycle deterioration of a lithium secondary battery and to deterioration of characteristics at the time of high-speed charging and discharging. When the specific surface area is too large, the initial irreversible capacity increases as side reactions occur more extensively on the surface and, in addition to this problem, a too large specific surface area is not desirable from the viewpoint of safety of the battery.

A method for determining the tap density of particulate materials is specified in JIS-K1501 and the tap density in this invention is determined in accordance with this method.

The reason for specifying the tap density after tapping 20 times is the finding that this serves best as an indicator of stability and maneuverability during the manufacture of electrodes. Likewise, the reason for specifying the tap density after tapping 300 times is the finding that this serves best as an indicator of the active material density after coating of the electrode foil.

Enhancement of the tap density not only readily assures a safe operation in the step for coating of the electrode foil but also assumes importance in transport and storage of the materials. For example, a comparison of natural graphite and mesophase microbeads, similar to each other in particle size distribution, shows that natural graphite has a tap density equal to ⅓ to ⅕ of that of the mesophase microbeads and, when coating solutions of the same concentration are prepared from the two, natural graphite yields a solution of such high viscosity as to resist uniform application in the coating step.

When the BET specific surface area exceeds 1.5 $m^2/g$, unevenness and irregularities occur on the coated surface in the manufacture of negative electrodes, notable adsorption of moisture in the air takes place to increase the concentration of impurities and side reactions occur more extensively in the initial stage of charging and discharging, all contributing to deterioration of electrode performance.

The tap density after tapping 20 or 300 times theoretically has an upper limit of 2.26 $g/cm^3$ which is the theoretical value for graphite crystals. The maximum tap density to be obtained in the practice of this invention is preferably 1.3 $g/cm^3$ or so after tapping 20 times or 1.5 $g/cm^3$ or so after tapping 300 times, although this varies with the average particle size and particle size distribution of the graphite material. There is no specific restriction on the lower limit of the specific surface area, but it is desirably 0.1 $m^2/g$ or more in order to maintain particles in good contact with each other.

The graphite material for negative electrode preferably shows a discharge capacity of 330 mAh/g or more and an initial irreversible capacity of 30 mAh/g or less. It is possible to offer a graphite material that satisfies each of the requirements of a large discharge capacity, little loss in capacity during charging and discharging and good particle characteristics by letting the graphite material in question satisfy the requirement of 330 mAh/g or more, preferably 340 mAh/g or more, for the discharge capacity and the requirement of 30 mAh/g or less, preferably 25 mAh/g or less, for the irreversible capacity.

Since the theoretical value of discharge capacity for graphite is 372 mAh/g, the range of the discharge capacity is preferably 330–372 mAh/g. Likewise, the range of the irreversible capacity is preferably 0–30 mAh/g.

Moreover, it is preferable that a graphite material for negative electrode shows a 10% cumulative particle diameter in the range of 2–12 μm, a 90% cumulative particle diameter in the range of 10–120 μm and an average particle diameter in the range of 5–100 μm. A graphite material that is controlled to satisfy the aforementioned requirements for the 10% cumulative particle diameter, average particle diameter (that is, 50% cumulative particle diameter) and 90% cumulative particle diameter can alleviate the problems associated with the coating of a metal foil with this graphite material in the manufacturing steps and contributes to an improvement of the performance of batteries. When the 10% cumulative particle diameter is below 2 μm or the average particle diameter is below 5 μm, fine particles come off the layer of electrode active material after coating. When the 10% cumulative particle diameter exceeds 12 μm, the points of contact of particles in the layer of negative electrode active material decrease in number and this deteriorates cycle and characteristics at the time of large-current charging and discharging. An average particle diameter in excess of 100 μm causes a problem of loss in smoothness during coating of an active material. Moreover, in the cases where the 90% cumulative particle diameter is below 10 μm, another problem arises in addition to the problem of coming off of fine particles, that is, the tap density and specific surface area become difficult to control. Where it is in excess of 120 μm, flaws tend to occur during coating of the active material.

The content of a boron material in the graphite material for negative electrode is preferably 0.1–2.0 wt % as boron and the content of carbon is preferably 98 wt % or more. The boron content in the graphite material is practically decided by how much boron material is added as a raw material. Boron atoms in the boron material displace carbon atoms in the graphite crystals or dissolve in graphite to form a solid solution at a high temperature prevailing during graphitization and those boron atoms which are present in excess of a certain amount separate out of the graphite crystals in the form of a compound such as boron carbide during the cooling step after completion of graphitization. The amount of boron that displaces carbon or forms a solid solution with carbon is approximately 1 wt % according to the phase diagrams reported up to the present.

The lithium secondary battery of this invention will be described below.

The lithium secondary battery of this invention contains a positive electrode active material, a negative electrode active material and a nonaqueous electrolyte and comprises the graphite material for negative electrode of this invention as a negative electrode active material.

A method for making a negative electrode with the graphite material for negative electrode of this invention used as an active material is not restricted as long as it can draw out sufficient performance from the material and is capable of molding the material into a desired shape and chemically and electrochemically safe.

To cite an example, a method is available which comprises adding particles or a dispersion of fluoropolymers such as polytetrafluoroethylene to a graphite material for negative electrode and kneading the resulting mixture. Another method comprises adding particles of fluoropolymers such as poly(vinylidene fluoride) (PVdF) or water-soluble carboxymethylcellulose as a binder to a graphite material for negative electrode, preparing a slurry from the mixture by the use of a solvent such as N-methylpyrrolidone (NMP), dimethylformamide, water and alcohol, applying the slurry to a current collector and drying.

The negative electrode active material of this invention can be used in an appropriate combination with a positive electrode active material and a nonaqueous electrolyte (for example, an electrolyte based on an organic solvent) and such positive electrode active material and nonaqueous electrolyte are not restricted as long as they are commonly used in lithium secondary batteries.

Useful as positive electrode active materials are lithium-containing transition metal oxides $LiM_xO_2$ or $LiM_yM'_{2-y}O_4$ (wherein M and M' are Co, Ni, Mn, Ti, Cr, V, Fe, Zn, Al, Sn or In and x and y are independently numbers in the range of 0–1), transition metal chalcogenides ($TiS_2$, $NbSe_3$, etc.), vanadium oxides ($V_2O_5$, $V_6O_{13}$, $V_2O_4$, $V_3O_8$, etc.) and lithium compounds thereof, Chevrel phase compounds represented by the general formula $M_xMo_6Ch_{8-y}$ (wherein x is a number in the range of 0–4, y is a number in the range of 0–1, M is a metal such as transition metal and Ch denotes a chalcogen), activated carbon and activated carbon fibers.

The following compounds are examples of nonaqueous electrolytes and they may be used singly or as a mixture of two kinds or more although there is no specific restriction on the selection of nonaqueous electrolytes; propylene carbonate, ethylene carbonate, butylene carbonate, chloroethylene carbonate, dimethyl carbonate, diethyl carbonate, ethyl methyl carbonate, 1,1-dimethoxyethane, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, anisole, diethyl ether, sulfolane, methylsulfolane, acetonitrile, chloronitrile, propionitrile, trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazolidone, ethylene glycol, sulfites, and dimethyl sulfite.

Any of known electrolytes such as the following can be used singly or as a mixture of two kinds or more; $LiClO_4$, $LiBF_4$, $LiPF_6$, $LiAsF_6$, $LiB(C_6H_5)$, $LiCl$, $LiBr$, $LiCF_3O_3$, $Li(CF_3SO_2)_2N$, $Li(CF_3SO)_3C$, $Li(CF_3CH_2OSO_2)_2N$, $Li(CF_3CF_2CH_2OSO_2)_2N$, $Li(HCF_2CF_2CH_2OSO_2)_2N$, $Li[(CF_3)_2CHOSO_2]_2N$ and $LiB[C_6H_3(CF_3)_2]_4$.

PREFERRED EMBODIMENTS OF THE INVENTION

The methods for determining the properties of a lithium secondary battery and a graphite material for negative electrode are described below.

Degree of Graphitization (d002, Lc)

Monochromatic X-ray beams are collimated into parallel beams and cast upon carbon particles containing high-purity silicon as an internal standard and the peak corresponding to the 002 plane of graphite is measured. The degree of graphitization is calculated by correcting the position and the half-width value of the peak with reference to the peak of the internal standard silicon.

Specific Surface Area

The specific surface area is determined by the BET method based on adsorption of nitrogen gas.

Tap Density

The tap density is determined in accordance with JIS-K1501. With the aid of an apparatus for measuring tap density, available from Seishin Enterprise Co., Ltd., the tap density is determined by tapping the specimen 20 or 300 times in a 100-cm³ plastic measuring cylinder.

Contents of Boron and Carbon

The contents of boron and carbon are determined by IPC (Inductively coupled high frequency plasma spectroscopy).

Particle Diameter

The particle diameter is obtained from the particle size distribution determined by laser diffraction and the particle diameter of 10% of particles on the fine particle side on a volume basis is referred to as 10% cumulative particle diameter and similarly the particle diameter of 50% of particles as average particle diameter and the particle diameter of 90% of particles as 90% cumulative particle diameter.

Fabrication of Electrodes and Measurement of Electrode Performance

A solution of PVdF in NMP (N-methyl-2-pyrrolidone) and particles of a graphite material for negative electrode were mixed so that the weight ratio of graphite to PVdF became 95:5 and the resulting mixture was kneaded and applied to a 20 μm-thick copper foil to give a negative electrode foil. The negative electrode foil was dried at 80° C. to evaporate the NMP and cut into a 10-mm square negative electrode. A three-electrode cell composed of this negative electrode, a counter electrode and a reference electrode was used to evaluate the electrode characteristics of the negative electrode as a single electrode. A solution of $LiClO_4$ in a 1:1 mixture by volume of ethylene carbonate and diethyl carbonate at a concentration of 1 mol/l was used as an electrolyte. The test for both charging and discharging was performed at a constant current of 0.1 $mA/cm^2$. The range of voltage was from 0 to 1.5 V (with metal lithium as standard). The initial charge capacity, initial discharge capacity, and initial charge and discharge efficiency were measured and, at the same time, the cycle characteristics were evaluated by observing the changes in discharge capacity after the second charging and discharging and thereafter.

EXAMPLE 1

Green coke in lumps prepared by delayed coking of coal-derived heavy oil was pulverized in a Raymond mill to an average particle diameter of 25 μm. The pulverized green coke was carbonized in a Riedhammer oven at approximately 800° C. to yield coke. To 300 g of this coke was added 1.93 g of boron carbide (0.5 wt % as B) and the mixture was graphitized. The product weighing approximately 300 g was classified by the use of a sieve with an opening of 75 μm and a portion passing the sieve and weighing 298 g was obtained as a graphite material.

EXAMPLE 2

Green coke in lumps prepared by delayed coking of coal-derived heavy oil was pulverized in a Raymond mill and passed through a sieve with an opening of 75 μm to remove coarse particles and control the average particle diameter at approximately 20 μm. The particles were carbonized in a Riedhammer oven at approximately 800° C. to yield coke. Observation under a polarized light microscope showed that the coke has anisotropy dye to flow texture. To 300 g of this coke was added 3.88 g of boron carbide (1.0 wt % as B) and the mixture was graphitized. The product weighing approximately 300 g was classified by the use of a sieve with an opening of 75 μm and a portion passing the sieve and weighing 298 g was obtained as a graphite material.

EXAMPLE 3

Green coke in lumps prepared by delayed coking of a mixture of coal-derived heavy oil and petroleum-derived heavy oil was pulverized in an impeller mill to an average particle diameter of 23 μm and then passed through a sieve with an opening of 75 μm to remove coarse particles and control the average particle diameter at approximately 22 μm. The particles were carbonized in a rotary kiln oven at approximately 1300° C. and then passed through a sieve with an opening of 75 μm to remove coarse particles and collect coke with an average particle diameter of approximately 22 μm. Observation under a polarized light microscope showed that the coke has anisotropy due to flow texture. To 198.6 g of this coke was added 1.4 g of metallic boron (0.7 wt % as B) and the mixture was graphitized. The product weighing approximately 200 g was classified by the use of a sieve with an opening of 63 μm and a portion passing the sieve and weighing 198 g was obtained as a graphite material.

EXAMPLE 4

Green coke in lumps prepared by delayed coking of coal-derived heavy oil was pulverized in an impeller mill to an average particle diameter of 30 μm and then passed through a sieve with an opening of 75 μm to remove coarse particles and control the average particle diameter at approximately 25 μm. The particles were carbonized in a Riedhammer oven at approximately 800° C. to yield coke. Observation under a polarized light microscope showed that the coke has anisotropy due to flow texture. To 300 g of this coke was added 1.93 g of boron carbide (0.5 wt % as B) and the mixture was graphitized. The product weighing approximately 300 g was pulverized in an impeller mill, then classified by the use of a sieve with an opening of 75 μm and a portion passing the sieve and weighing 285 g was obtained as a graphite material.

COMPARATIVE EXAMPLE 1

Green coke in lumps prepared by delayed coking of coal-derived heavy oil was pulverized in a Raymond mill to an average particle diameter of 25 μm. The particles were carbonized in a Riedhammer oven at approximately 800° C. to yield coke. The coke alone was graphitized. The product was classified by the use of a sieve with an opening of 75 μm and the particles passing through the sieve were collected as a graphite material.

COMPARATIVE EXAMPLE 2

Green coke in lumps prepared by delayed coking of coal-derived heavy oil was carbonized in a Riedhammer oven at approximately 800° C. to yield coke. The coke was pulverized in a Raymond mill to an average particle diameter of 25 μm. To 300 g of the pulverized coke was added 1.93 g of boron carbide (0.5 wt % as B) and the mixture was graphitized. The product weighing approximately 300 g was classified by the use of a sieve with an opening of 75 μm and a portion passing the sieve and weighing 298 g was obtained as a graphite material.

COMPARATIVE EXAMPLE 3

Green coke in lumps prepared by delayed coking of coal-derived heavy oil was carbonized in a rotary kiln oven at approximately 1300° C. to yield coke. To 300 g of the coke was added 1.93 g of boron carbide (0.5 wt % as B) and the mixture was graphitized. The product weighing approximately 300 g was pulverized in an impeller mill, classified by the use of a sieve with an opening of 75 μm and a portion passing the sieve and weighing 299 g was obtained as a graphite material.

The conditions and results of the graphitization treatment are summarized in Table 1. The graphitization was carried out in an argon atmosphere in all the examples and comparative examples.

TABLE 1

|  | Example No. | | | | | | |
|---|---|---|---|---|---|---|---|
|  | Example | | | | Comparative example | | |
|  | 1 | 2 | 3 | 4 | 1 | 2 | 3 |
| Graphitization temperature (° C.) | 2650 | 2650 | 2850 | 2800 | 2650 | 2650 | 2650 |
| Time (hr) | 1 | 1 | 1 | 1 | 1 | 1 | 1 |
| Characteristics of a graphite material | | | | | | | |
| Tap density after tapping 20 times g/cm$^3$ | 1.02 | 1.00 | 1.01 | 0.97 | 1.03 | 0.85 | 0.80 |
| Tap density after tapping 300 times g/cm$^3$ | 1.23 | 1.21 | 1.24 | 1.18 | 1.25 | 1.02 | 0.99 |
| BET specific surface area m$^2$/g | 0.7 | 0.8 | 0.6 | 1.0 | 0.5 | 1.6 | 1.7 |
| d002 Å | 3.356 | 3.356 | 3.355 | 3.355 | 3.386 | 3.356 | 3.356 |
| Lc nm | >100 | >100 | >100 | >100 | 42 | >100 | >100 |
| Characteristics of electrode | | | | | | | |
| Initial charge capacity mAh/g | 366 | 364 | 369 | 370 | 321 | 377 | 380 |
| Initial discharge capacity mAh/g | 347 | 348 | 352 | 351 | 287 | 345 | 344 |
| Initial irreversible capacity mAh/g | 19 | 16 | 17 | 19 | 34 | 33 | 36 |

The graphite materials obtained in Examples 2, 3 and 4 showed 10% cumulative particle diameters of 7.6 μm, 7.9 μm and 6.9 μm respectively, average particle diameters of 29 μm, 28 μm and 24 μm respectively and 90% cumulative particle diameters of 72 μm, 70 μm and 55 μm respectively. Furthermore, they showed boron contents of 0.9 wt %, 0.7 wt % and 0.4 wt % respectively and carbon contents of 99 wt %, 99 wt % and 99 wt % respectively.

In any of the Examples, the graphite material possessed good electrode characteristics as evidenced by practically no change in discharge capacity after the second charging and discharging and thereafter and by excellent cycle characteristics. The negative electrode foil made from the graphite material presented no problem in respect to adhesiveness and no peeling or falling off was observed during assembling of a testing cell or after evaluation of cycle characteristics. The material had a smooth surface and showed no flaws and irregularities when observed visually after application by coating.

In Comparative Examples 2 and 3, however, deterioration in discharge capacity was noticed and problems arose in cycle characteristics after the second charging and discharging and thereafter. Peeling of the negative electrode foil obtained by the use of the materials in these comparative examples was observed after evaluation of the aforementioned cycle characteristics of the electrode. Further, some flaws were observed upon examination of the smoothness of surface.

INDUSTRIAL APPLICABILITY

This invention provides a graphite material for negative electrode of lithium secondary battery which has a large discharge capacity and suffers little loss in capacity during charging and discharging. This invention also provides a lithium secondary battery which is small in size and light in weight and has a long life.

What is claimed is:

1. A process for manufacturing a graphite material for negative electrode of lithium secondary battery, which process comprises pulverizing green coke produced from coal- or petroleum-derived heavy oil by a delayed coker to an average particle diameter of 50 μm or less, carbonizing the pulverized green coke at 700–1500° C. to yield coke, adding one kind or more or boron or a compound thereof to the coke, graphitizing the resulting mixture, and controlling the particle size of the graphite material produced, wherein the coke possesses anisotropy due to flow texture, wherein the green coke after pulverization and/or carbonization is subjected to deagglomeration and/or classification to control the average particle diameter of the green coke in the range of 3–50 μm, wherein boron or the compound thereof is added in an amount of 0.1–5.0 wt % as boron, wherein the control of the particle size consists of passing the pulverized particles through a sieve with an opening of 10–120 μm to remove coarse particles, and wherein the graphite material comprises (a) a tap density of 0.95 g/cm$^3$ or more after tapping 20 times or 1.15 g/cm$^3$ more after tapping 300 times, and a BET specific surface area of 1.5 m$^2$/g or less, and (b) a 10% cumulative particle diameter in the range of 2–12 μm, a 90% cumulative particle diameter in the range of 10–120 μm and an average particle diameter in the range of 5–100 μm.

2. A process for manufacturing a graphite material for negative electrode of lithium secondary battery as described in claim 1 wherein the graphitization treatment consists of a heat treatment to be performed in an argon atmosphere at or above 2600° C.

3. A process for manufacturing a graphite material for negative electrode of lithium secondary battery as described in claim 1 wherein the boron compound is boric acid, boron oxide, boron carbide, boron nitride or a borate salt.

4. A process for manufacturing a graphite material for negative electrode of lithium secondary battery as described in claim 1 wherein the green coke after pulverization is subjected to an oxidation treatment before the carbonization treatment.

* * * * *

UNITED STATES PATENT AND TRADEMARK OFFICE
CERTIFICATE OF CORRECTION

PATENT NO. : 7,141,229 B2  Page 1 of 1
APPLICATION NO. : 10/469854
DATED : November 28, 2006
INVENTOR(S) : Yoichi Kawano et al.

It is certified that error appears in the above-identified patent and that said Letters Patent is hereby corrected as shown below:

Title Page:
Item (54) should read as follows:
-- GRAPHITE MATERIAL FOR NEGATIVE ELECTRODE OF LITHIUM SECONDARY BATTERY, MANUFACTURE THEREOF AND LITHIUM SECONDARY BATTERY --.

Signed and Sealed this

Twentieth Day of March, 2007

JON W. DUDAS
*Director of the United States Patent and Trademark Office*